Sept. 3, 1968  J. N. MASON ET AL  3,400,039
COMPOSITE CARPET MATTING AND METHOD OF MAKING THE SAME
Filed Oct. 14, 1965  2 Sheets-Sheet 1
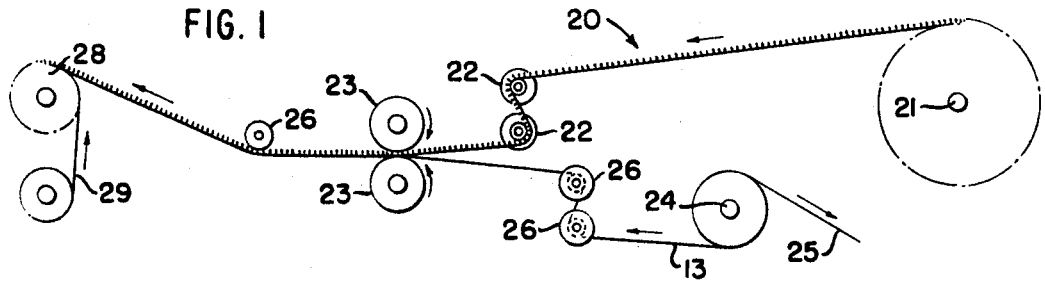
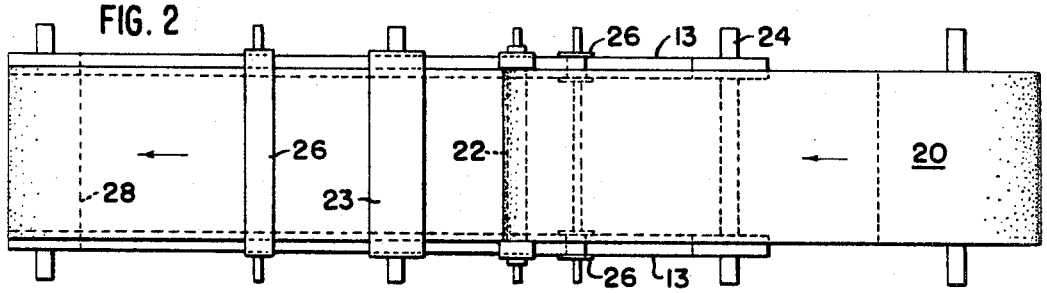
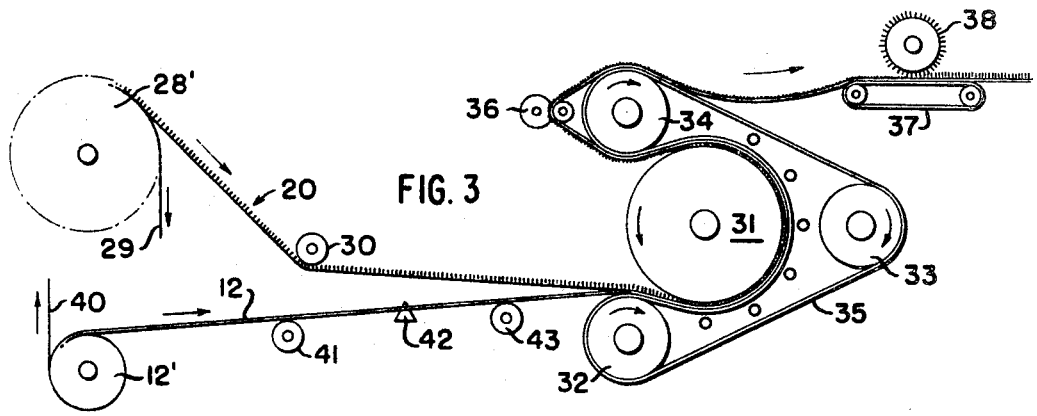
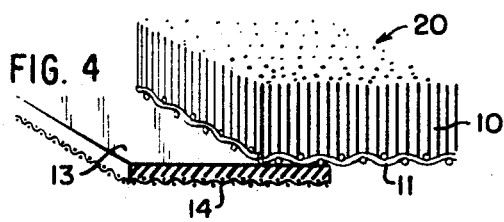
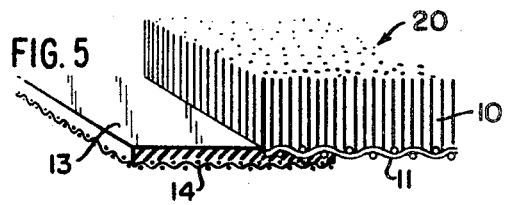
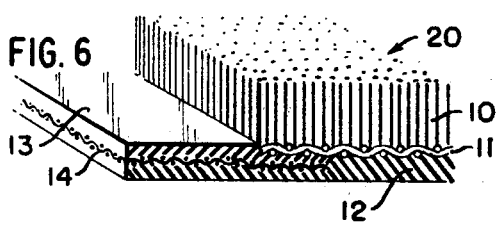
INVENTORS
JAMES N. MASON
BY MARVIN M. KAHN
ATTORNEYS

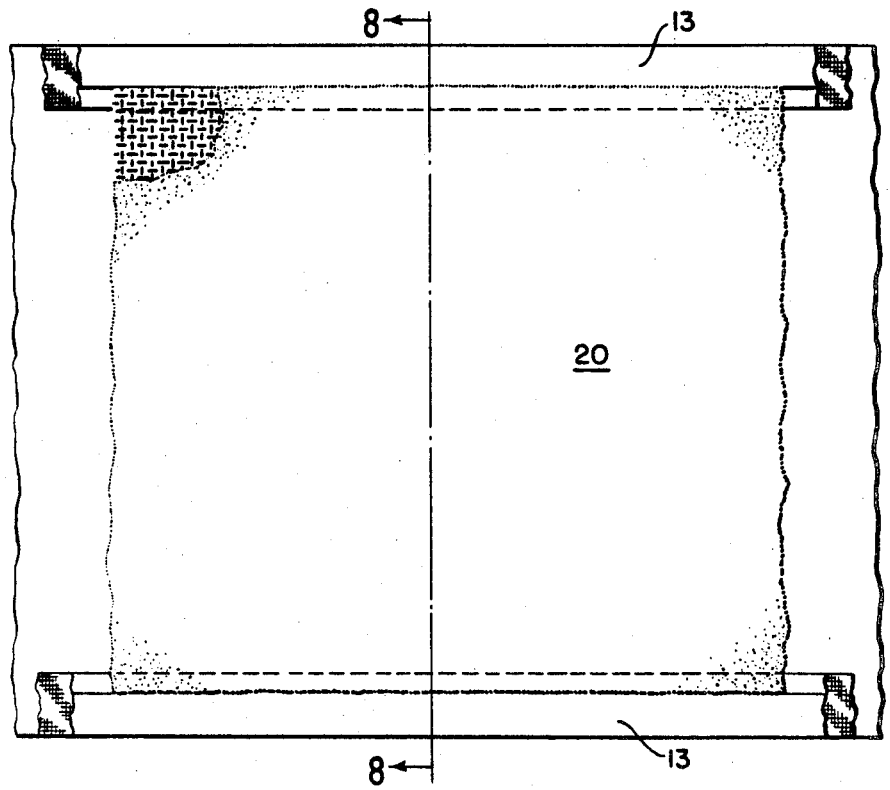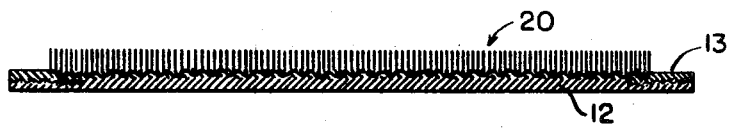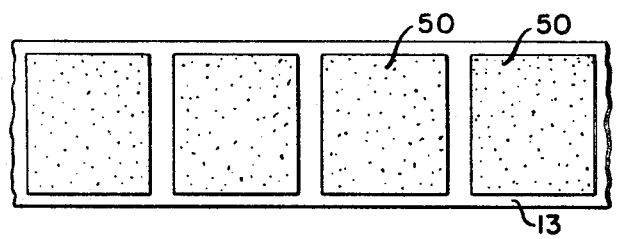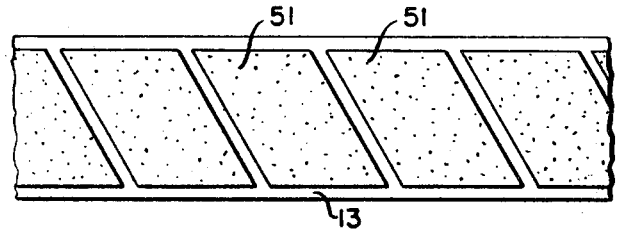

United States Patent Office

3,400,039
Patented Sept. 3, 1968

3,400,039
COMPOSITE CARPET MATTING AND METHOD
OF MAKING THE SAME
James N. Mason, Winchester, and Marvin M. Kahn, Newton, Mass., assignors to American Biltrite Rubber Co., Inc., Chelsea, Mass., a corporation of Delaware
Filed Oct. 14, 1965, Ser. No. 496,062
11 Claims. (Cl. 161—63)

This invention comprises a new and improved type of composite matting and a novel process of producing the same. The matting includes in its structure a surface ply of textile carpet or carpet fabric, an underlying backing ply of rubber or plastic stock which is extended to provide a border about the margin of the carpet ply, and an additional edge band of plastic or rubber stock bonded to the extended backing ply and to the adjacent under-surface of the carpet ply.

The novel process of making this composite matting is characterized by the steps of first attaching a plastic edge band in overlapping relation to the under surface of the carpet ply, then covering the carpet ply and band overall with a sheet of plastic backing stock and finally bonding these three elements together under conditions of heat and pressure.

Many attempts have been made in the past to produce at moderate cost a composite matting of this general type that is satisfactory to the user, but various difficulties have been encountered. For example, the extended border is likely to be flimsy and subject to curling, cracking and tearing off. Further, at the cut edge of the carpet the woven or felted backing presents a noticeably rough appearance even after being bonded to an under ply of rubber. Also at the cut edges of the carpet the unprotected carpet yarn is prone to pull out under service conditions of use.

It has been impossible to avoid these undesirable defects in appearance and wear by processes of manufacture heretofore known. The present invention obviates these defects, provides an improved functional design of matting, saves material cost and results in reduced labor charges.

More particularly our novel process produces matting improved by an extended edge of substantial thickness and a structure which eliminates curling and cracking as well as pull-out of carpet yarn. The improved product of our invention is adaptable for production in new and complex designs by continuous and automatic procedure, and eliminates the need for expensive contour moulds.

Although it has been possible to add heretofore a cut piece of carpet to a rubber base by cementing or vulcanizing, the resulting fabrication is weakened and flimsy at the edges of the mat. Moreover, the result does not give the appearance of an integrated unit. In the novel process of our invention the base ply of the carpet is first coated with a latex cement, then attached to the edge bands and finally molded directly against the uncured rubber base stock thereby vulcanizing the components into one integrated unit.

The carpet may be of any standard variety such as tufted, woven or braided with cut or loop pile and with surface yarns of natural wool or synthetic fiber. The backing yarn is usually jute but may be of other standard fibers.

The process of my invention is also advantageous in that it obviates the necessity of employing a step mold, that is to say, a mold shouldered to receive a thick layer of carpet and backing stock and a thinner protecting flange of plastic material.

These and other features of the invention will be best understood and appreciated from the following description of a preferred manner of carrying out the process as suggested in the accompanying drawings in which:

FIGS. 1 and 2 are diagrammatic views in elevation and plan of apparatus for applying the plastic edge strips to the carpet ply, FIG. 3 is a diagrammatic view in elevation of apparatus for carrying out the final vulcanizing and finishing steps of the process, FIGS. 4, 5 and 6 are fragmentary views illustrating the product at different stages of the process, FIGS. 7, 9 and 10 are fragmentary plan views of the finished matting in different designs, and FIG. 8 is a view in cross section on the line 8—8 of FIG. 7.

As shown in FIG. 6 the finished product comprises a ply 10 of pile carpet having a woven backing ply 11 of jute or the like, a ply 12 of plastic backing stock and an edge strip 13 of plastic material such as uncured rubber which may or may not be reinforced with a woven ply 14. The edge strip 13 overlaps the cut edge of the carpet ply 10 and extends outwardly therefrom and inwardly between the carpet ply 10 and the backing ply 12. The backing ply 12 underlies both the edge strip and the carpet ply and presents a smooth continuous under surface of the matting.

The first step in the process is preliminarily to attach an edge strip of uncured rubber to a carpet ply. This is shown in FIGS. 1 and 2 where a web 20 of pile carpet is supplied from a coil on a transverse shaft 21 and led by guide rolls 22 to a pair of nip rolls 23.

At the same time a pair of edge strips 13 is led from coils on a shaft 24 through guide rolls 26 to the nip rolls 23. A liner 25 is removed from the edge strips as they leave the coil on the shaft 24. At the nip rolls the edge strips 13 are pressed into preliminary attachment with the underside of the carpet along both edges thereof in overlapping relation as shown in FIGS. 1, 2 and 5. The carpet with the attached edge strips now passes beneath a guide roll 26 and is wound into a coil 28. Strip liners 29 are introduced at this point to prevent the uncured material of the edge strip from adhering.

FIG. 3 suggests the step of combining the carpet and edge strip assembly with backing stock 12, which may be of unvulcanized rubber or other plastic polymeric composition. A coiled carpet with its edge strip is drawn from a coil 28' where the liners 29 are removed. It passes beneath a guide roll 30 to the bite of a vulcanizing machine of the well known "Rotocure" type. This comprises a large heated drum 31 associated with guide rolls 32, 33 and 34 which direct a pressure band 35 in an approximately triangular path which includes a substantial portion of the arcuate surface of the drum 31. Sheet or strip material entering between the drum 31 and the roll 32 is subjected to heat and severe pressure beneath the band 35 as it is advanced slowly about the circumference of the drum.

The sheet backing stock 12 is drawn from the coil 12' at which a liner 40 is removed. It is advanced over a guide roll 41 between shearing knives 42, over a guide roll 43 and meets the carpet web between the drum 31 and the pressure roll 32. The trimming knives 42 serve to trim the excess width of the uncured backing stock to correspond substantially with the overall width of the carpet assembly 28. In passing about the drum 31 the pile of the carpet is compressed. The overall compressed gauge of carpet surface pile, including the jute backing, is substantially equal to the total thickness of the edge strips 13, with its fabric reinforcement 14, and it is on this account that a shouldered mold is unnecessary since the surface of the drum 31 and pressure band 35 are effective to exert sufficient and uniform pressure on all components of the composite matting which enter between them.

In passing about the roll 34 the partially formed product is directed between cooperating shearing rolls 36 where the projecting outer edge of the combined edge strip 13 and the backing stock 12 are trimmed to the desired final width of the matting. Upon leaving the roll 34 the matting is advanced by an endless conveyor 37 to a rotary brush 38 which is effective in brushing up and erecting the pile of the carpet.

FIGS. 7 and 8 illustrate a matting in the form of a runner having projecting margins of plastic material comprised by the edge strips 13 and the united backing stock 12.

FIG. 9 illustrates another runner pattern of matting wherein squares 50 of carpet are first provided with edge strips on all four sides and then united to a continuous sheet of backing stock. In this case a long runner may be segmented into separate sections having borders on all sides. For example, a four foot runner may be converted to a series of 4 x 4 feet bordered mats by shearing midway between the carpet squares. The dealer may thus sell runners and mats from the same coil.

In FIG. 10 another pattern is shown in which trapezoidal segments of carpet are similarly treated in the production of another distinctive runner pattern.

The preassembly of carpet segments and edge facing strips require multiple longitudinal strips or combination of longitudinal and transverse strips. However, it has been found that for a runner having a small number of separate elements it is practical to feed output of carpet segments and facing strips directly into the press at the same time wih the back stock, although it is preferable for strips to be run in with the carpet edges overlapping. For added reinforcement, the strips can also be laid in to butt lap edges of carpet.

In making segmental mats from a runner the precut carpet segments may be stacked in alternation with the precut transverse edge strips. For a segmented runner extended to finish 48 inches wide the carpet segments may be 45½ inches square. The marginal edge strips should be 2 to 2½ inches wide, for ½ inch overlap and ¾ inch final edge trim, leaving 1¼ inch wide extended borders. The transverse facing strips should be approximately 3½ inches wide with one half inch overlap thus allowing for 1 and ¼ inches transverse borders after cutting. The length of the transverse strips may be 44½ inches to butt up against the two longitudinal edge strips. It has been found that a small overlap of the transverse strips under the longitudinal strips is entirely unobjectionable.

It will be apparent that further laminations of sponge rubber or foam type backing and also additional fabric, woven and non-woven, can be incorporated in the finished matting. For further decorative effect the edge strips, both external borders and internal areas, may be made in colors to blend with the carpet, still employing the low cost jute backing stock. Also, when an embossed drum 31, FIG. 3, is used, attractive patterns are molded into the surfaces of the edge facing strips.

Whereas we have discussed the invention in terms of rubber it will be apparent that natural, re-claimed or synthetic plastic polymers, both thermoplastic and thermosetting, could be advantageously employed.

Having thus disclosed our invention and described in detail an illustrative example thereof we claim as new and desire to secure by Letters Patent:

1. A composite matting comprising a surface ply of carpet fabric, an edge strip of sheet plastic material bonded to the underside of the carpet ply and extending outwardly from its edge, and a backing ply of plastic material underlying both the carpet ply and the said edge strip and bonded thereto in coextensive union.

2. A composite matting as described in claim 1, further characterized in that the under surface of the plastic edge strip has incorporated therein a fabric reinforcing ply.

3. A composite matting as described in claim 1, further characterized in that the surface ply comprises textile pile carpet and both the edge strip and backing ply are of vulcanized rubber.

4. A composite matting as described in claim 1, further characterized in that the carpet ply includes multiple segments bounded by external edge surface bands and separated by internal transverse bands.

5. A composite runner matting comprising a surface ply of carpet, separate edge strips of rubber bonded to the under side of the carpet and extending outwardly along both edges of the carpet ply, and a backing ply of rubber underlying both the carpet ply and said edge strips and bonded thereto in continuous union.

6. A composite matting comprising a surface ply of carpet having edge strips of rubber bonded to its under surface and extending outwardly along all its edges, and a rubber backing ply underlying and bonded to the carpet ply and all of said edge strips.

7. The process of making composite matting, comprising the steps of attaching a continuous ribbon of plastic material to the under surface of a carpet ply in overlapping relation to one of its edges, then covering the under surface of the carpet ply and of the said ribbon with a continuous sheet of plastic backing material, and uniting their contiguous surfaces under conditions of heat and pressure.

8. The process defined in claim 7 further characterized by the step of compressing the carpet ply with its backing sheet to approximately the thickness of the united backing sheet and attached ribbon during the uniting step and then restoring the carpet to its initial thickness.

9. The process of making composite matting, comprising the steps of preliminarily attaching an edge strip of unvulcanized rubber to the latex-coated under surface of a pile carpet ply in overlapping relation to one of its edges, covering the under surface of the carpet ply and of the rubber edge strip with a backing sheet of rubber, permanently uniting them by vulcanization under heat and pressure which substantially reduces the thickness of the carpet ply, and then brushing up the pile of the carpet ply.

10. The process of making composite matting as described in claim 9 further characterized by the step of trimming the outer edge of the bonded edge strip and rubber backing sheet at a predetermined distance from the edge of the carpet ply.

11. The process of making composite matting characterized by the steps of continuously rolling an edge strip of unvulcanized rubber into preliminary adhesive contact and in overlapping relation with respect to the under surface of a latex-coated carpet ply, covering the lower surface of said strip and carpet ply with a sheet of uncured rubber backing stock, and progressively vulcanizing together the contiguous surfaces of the carpet ply, the edge strip and the underlying sheet of backing stock.

References Cited

UNITED STATES PATENTS 3,120,083 2/1964 Dahlberg et al. ____ 161—149 XR
3,166,455 1/1965 Levitch _____ 156—88

ROBERT F. BURNETT, *Primary Examiner.*

R. H. CRISS, *Assistant Examiner.*